US008825287B2

(12) United States Patent
Lange et al.

(10) Patent No.: US 8,825,287 B2
(45) Date of Patent: Sep. 2, 2014

(54) VEHICLE DOOR LATCH SYSTEM AND METHOD

(71) Applicant: GM Global Technology Operations LLC, Detroit, MI (US)

(72) Inventors: Richard J. Lange, Troy, MI (US); Frank J. Arabia, Jr., Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/737,830

(22) Filed: Jan. 9, 2013

(65) Prior Publication Data

US 2014/0195109 A1 Jul. 10, 2014

(51) Int. Cl.
*G06F 7/00* (2006.01)

(52) U.S. Cl.
USPC .............................................. 701/36; 701/45

(58) Field of Classification Search
USPC ..................................................... 701/36, 45
See application file for complete search history.

(56) References Cited

U.S. PATENT DOCUMENTS

| | | | | |
|---|---|---|---|---|
| 5,739,674 | A * | 4/1998 | Kawahara et al. | 320/106 |
| 2003/0216817 | A1* | 11/2003 | Pudney | 700/17 |
| 2005/0197747 | A1* | 9/2005 | Rappaport et al. | 701/1 |
| 2008/0000711 | A1* | 1/2008 | Spurr | 180/289 |
| 2008/0100092 | A1* | 5/2008 | Gao et al. | 296/146.11 |
| 2010/0007463 | A1* | 1/2010 | Dingman et al. | 340/5.72 |
| 2010/0052337 | A1 | 3/2010 | Arabia, Jr. et al. | |
| 2010/0230193 | A1* | 9/2010 | Grider et al. | 180/65.27 |
| 2011/0061927 | A1* | 3/2011 | Bidinost et al. | 174/521 |

* cited by examiner

Primary Examiner — Hussein A. Elchanti
(74) *Attorney, Agent, or Firm* — Ingrassia Fisher & Lorenz, P.C.

(57) ABSTRACT

Methods and systems are provided for door latches for vehicles. The system includes an electric door latch mechanism movable between a latched position and an unlatched position. Exterior and interior open switches are disposed a door for receiving an unlatch request from an outside or an inside of the vehicle. A controller is in communication with the exterior open switch, the interior open switch, and the electric door latch mechanism. The controller is configured to assign either a locked state or an unlocked state for each of the open switches. The controller is also configured to control operation of the electric door latch mechanism such that the electric door latch mechanism is commanded to move from the closed position to the open position in response to the unlatch request from the open switches when the respective open switch is in the unlocked state.

17 Claims, 2 Drawing Sheets

VEHICLE DOOR LATCH SYSTEM AND METHOD

TECHNICAL FIELD

The technical field generally relates to door latches for vehicles, and more particularly relates to electrically-actuated door latches for vehicles.

BACKGROUND

Automobiles have long utilized door lock mechanisms to prevent unauthorized access to the vehicles. The earliest such mechanisms were purely mechanical in nature. To actuate these purely mechanical mechanisms, a user would manually utilize a lever, a post, and/or a tumbler lock to move the mechanism between a locked state and an unlocked state through a series of linkages. More recently, electric solenoids and/or motors have been added to such mechanical mechanism to allow actuation of the mechanism between states via a switch and/or “key-fob”.

Even more recently, automobiles have been implemented without the manual linkages between levers, posts, and/or tumbler locks and the door lock mechanism. Instead, actuation of the mechanism between locked and unlocked states is purely electrically controlled. However, some issues with this approach have been identified. For instance, it is difficult to ascertain the locked or unlocked state of the door without the lever or post, as these mechanical devices traditionally provided a visual indication of the locked or unlocked state. Accordingly, it is desirable to provide an electric door latch system that provides indication of the locked or unlocked state of the doors.

Legacy mechanical door lock mechanisms also suffer security and convenience issues. For example, if a door is unlocked, an intruder could open the door while the automobile is occupied and stopped. Conversely, if the doors are locked, then a quick exit by a passenger is difficult. Therefore, it is also desirable to provide additional security to the driver and passengers of the vehicle while maintaining ease of egress from the vehicle.

Furthermore, other desirable features and characteristics of the present invention will become apparent from the subsequent detailed description and the appended claims, taken in conjunction with the accompanying drawings and the foregoing technical field and background.

SUMMARY

A door latch system for a vehicle is provided. The vehicle includes a body defining an inside and an outside. The vehicle also includes a door having an exterior side associated with the outside of the vehicle and an interior side associated with the outside of the vehicle. In one embodiment, the system includes an electric door latch mechanism movable between a latched position and an unlatched position. An exterior open switch is disposable on the exterior side of the door for receiving an unlatch request from the outside of the vehicle. An interior open switch is disposable on the interior side of the door for receiving an unlatch request from the inside of the vehicle. The system also includes a controller in communication with the exterior open switch, the interior open switch, and the electric door latch mechanism. The controller is configured to assign either a locked state or an unlocked state for each of the open switches. The controller is also configured to control operation of the electric door latch mechanism such that the electric door latch mechanism is commanded to move from the closed position to the open position in response to the unlatch request from the open switches when the respective open switch is in the unlocked state.

A method is provided for operating an electric door latch mechanism of a vehicle. The vehicle includes a body defining an inside and an outside. The vehicle also includes a door having an exterior side associated with the outside of the vehicle and an interior side associated with the outside of the vehicle. The mechanism is movable between a latched position and an unlatched position. An exterior open switch is disposed on the exterior side of the door and an interior open switch disposed on the interior side of the door. A controller is in communication with the switches and the mechanism. In one embodiment, the method includes assigning either a locked state or an unlocked state for each of the open switches. The method also includes receiving an unlatch request signal at the controller from at least one of the switches. The method further includes sending a control signal from the controller to the door control mechanism to move the mechanism from the closed position to the open position in response to receiving the unlatch request from one of the open switches and the respective open switch is in the unlocked state.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, a door latch system 200 for a vehicle 100 is shown and described herein.

The vehicle 100 of the illustrated embodiments is an automobile (not separately numbered) having an engine (not shown) coupled to a transmission (not shown) to drive a plurality of wheels (not shown), as is appreciated by those skilled in the art. The transmission of the illustrated embodiments is an automatic transmission which includes a “park” mode and at least one “drive” mode, as is customary. However, the door latch system 200 described herein may be implemented in automobiles having other types of transmissions or other types of vehicles 100 in general.

Figure 1:
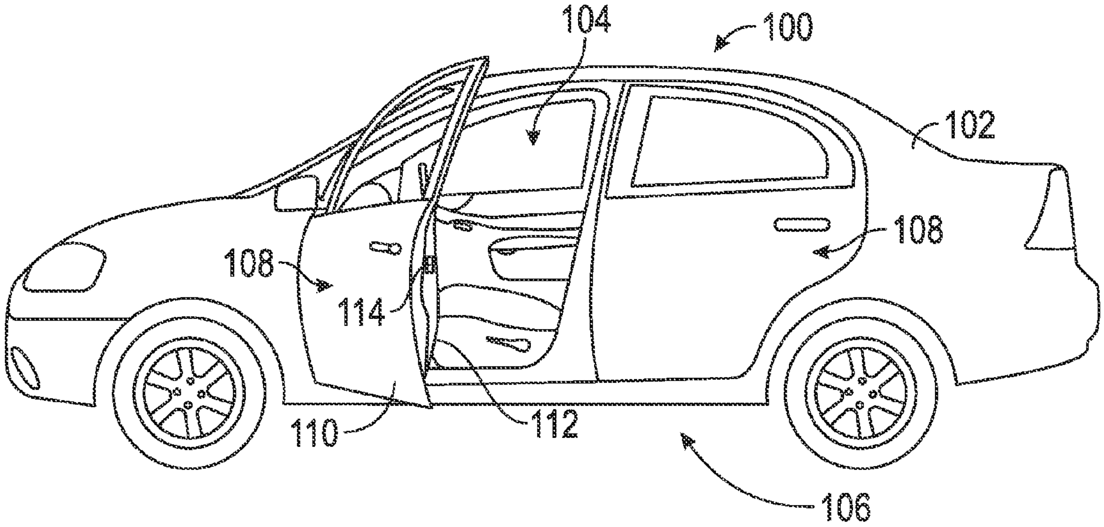
FIG. 1 is a side-view of a vehicle in accordance with an embodiment.

Referring to FIG. 1, the vehicle 100 has a body 102 defining an inside 104 and an outside 106, as is well appreciated by those skilled in the art. The inside 104 of the vehicle may be referred to as a passenger compartment. The vehicle 100 of the illustrated embodiment includes a plurality of doors 108 to allow ingress and egress from the passenger compartment. Specifically, the vehicle 100 of the illustrated embodiment includes four doors 108. However, in other embodiments, the vehicle 100 may include more or less than four doors 108.

Figure 2:
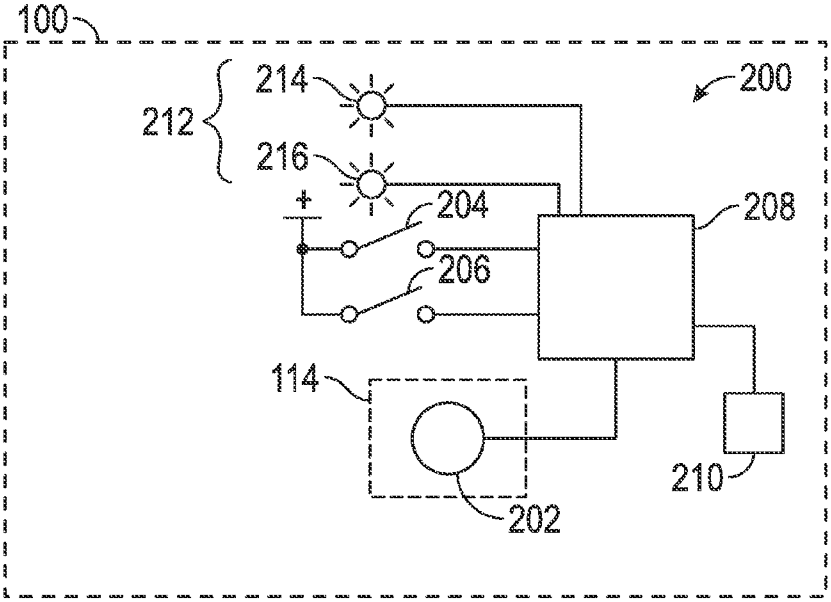
FIG. 2 is a block schematic diagram of a door latch system of the vehicle in accordance with an embodiment.

Each door 108 includes an exterior side 110 and an interior side 112. The exterior side 110 generally faces the outside 106 of the vehicle 100 and the interior side 112 generally faces the inside 104 of the vehicle 100. Said another way, the exterior side 110 is associated with the outside 106 of the vehicle 100 and the interior side 112 is associated with the inside 104 of the vehicle 100. Each door 108 further includes an electric door latch mechanism 114. The electric door latch mechanism 114 is movable between a latched position and an unlatched position. For example, the door latch mechanism 114 may include a fork bolt lever (not numbered) engagable with a striker (not shown). The fork bolt lever is securely latched with the fork bolt lever when the door latch mechanism 114 is in the latched position and is released from the fork bolt lever when the door latch mechanism 114 is in the unlatched position. Referring now to FIG. 2, the door latch mechanism 114 may include an electric motor 202 or other electrically-actuated mechanism to regulate movement of the door latch mechanism 114 between the latched position and the unlatched position.

Figure 3:
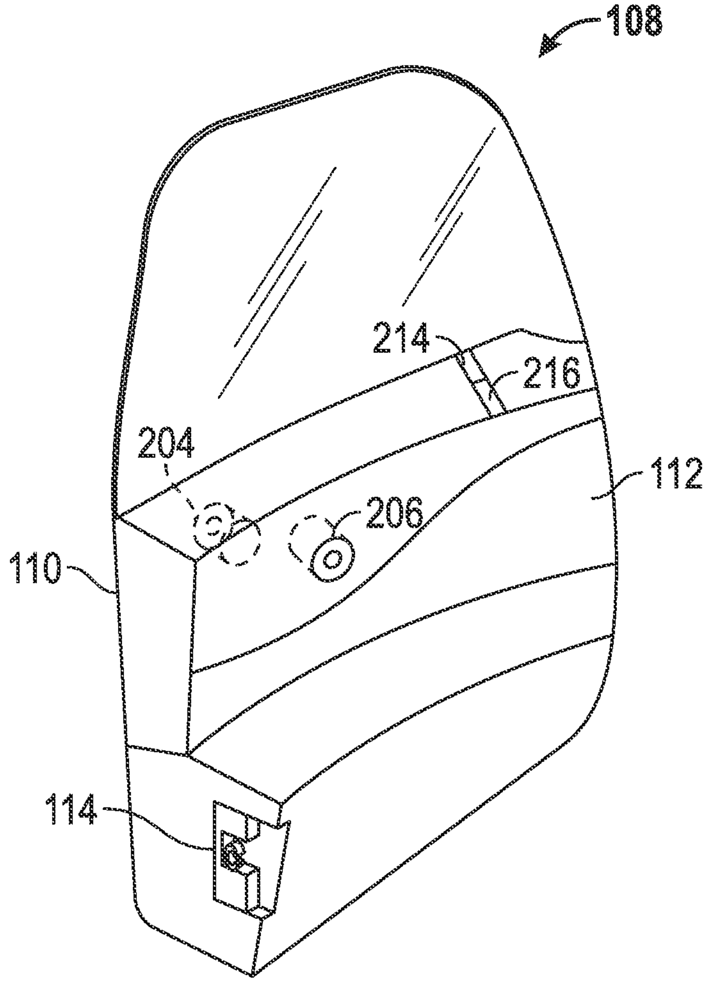
FIG. 3 is a perspective view of a door of the vehicle in accordance with an embodiment.

The door latch system 200 includes an exterior open switch 204 and an interior open switch 206. In the illustrated embodiment, as shown in FIG. 3, the exterior open switch 204 is disposed on the exterior side 110 of the door 108 and the interior open switch 206 is disposed on the interior side 112 of the door 108. A user may actuate one of the open switches 204, 206 to request that the door 108 be unlatched from the body 102. More specifically, a user may actuated either (or both) of the switches 204, 206 to request that the electric door latch mechanism 114 moves to the unlatched position. Typically, the exterior open switch 204 receives an unlatch request from the outside 106 of the vehicle 100 and the interior open switch 206 receives an unlatch request from the inside 104 of the vehicle 100.

Each open switch 204, 206 may be operatively connected to a hinged handle (not numbered) such that when a user actuates the handle, the unlatch request is received by the respective open switch 204, 206. Alternatively, the each open switch 204, 206 may be a push button (not numbered). Those skilled in the art will realize other types and styles of switches to implement the interior and exterior open switches 204, 206.

Referring again to FIG. 2, the door latch system 200 further includes a controller 208. The controller 208 may comprise a computer, a processor, a microprocessor, an application specific integrated circuit ("ASIC"), digital logic gates, and/or another suitable device capable of receiving data and executing instructions in response to the received data. The controller 208 may be disposed within the door 108. However, it is to be appreciated that the controller 208 may be disposed at other locations. Furthermore, the controller 208 of the door latch system 200 may be part of a vehicle control unit (not shown) which controls other aspects of the vehicle 100 as well.

Referring back to FIG. 2, the controller 208 is in communication with the exterior open switch 204 and the interior open switch 206. The switches 204, 206 may be electrically connected (either directly or indirectly) to the controller 208 to facilitate the communication therebetween. However, in other embodiments, radio frequency (RF) or other communication techniques may be implemented. The controller 208 receives an exterior unlatch request signal from the actuation of the exterior open switch 204 and an interior unlatch request signal from the actuation of the interior open switch 206.

The controller 208 is also in communication with electric door latch mechanism 114. The controller 208 is configured to control movement of the electric door latch mechanism 114 between the latched and unlatched positions. That is, the controller 208 may send a control signal carrying an unlatch command or a latch command to the electric door latch mechanism 114. In the illustrated embodiment, the controller 208 is in communication with the electric motor 202 to control operation of the electric motor 202. The electric door latch mechanism 114 may include a motor starter (not shown) or other drive circuit to control operation of the electric motor 202. Of course, other configurations of the electric door latch mechanism 114 will be realized by those skilled in the art.

The controller 208 is configured to assign either a locked state or an unlocked state for each of the open switches 204, 206. The controller 208 will send the unlatch command to the electric door latch mechanism 114 in response to receiving unlatch request signal from the open switch 204, 206 in the unlocked state. Moreover, the electric door latch mechanism 114 will be commanded to open in response to the unlatch request from the open switches 204, 206 only when the respective open switch 204, 206 is in the unlocked state. Said another way, upon receipt of a control signal carrying an unlatch command from the controller 208, the door latch mechanism 114 will move from the latched position to the unlatched position.

For example, if exterior open switch 204 is assigned to the locked state and the interior open switch 206 is assigned to the unlocked state, then the controller 208 will send the unlatch command to the electric door latch mechanism 114 in response to receiving the unlatch request signal from the interior open switch 206. However, the controller 208 will not send the unlatch command in response to receiving the unlatch request signal from the exterior open switch 204. Accordingly, the door 108 may be unlatched and opened only if the user depresses the interior open switch 206. The door 108 will not be unlatched, and thus will remain closed, if the user depresses the exterior open switch 204.

In another example, if both the exterior and interior open switches 204, 206 are assigned to the unlocked state, then the door 108 may be opened using either of the open switches 204, 206. In yet another example, if both the exterior and interior open switches 204, 206 are assigned to the locked state, then the door 108 may not be unlatched using either of the open switches 204, 206.

The controller 208 of the illustrated embodiment is configured to include an unlocked mode for the entire vehicle 100. In the unlocked mode, each of the open switches 204, 206 for each door 108 is assigned to the unlocked state. The controller 208 of the illustrated embodiment is configured to include a locked mode for the entire vehicle 100. In the locked mode, each of the open switches 204, 206 for each door 108 is assigned to the locked state. A user may select the unlocked mode or the locked mode using a switch (not shown) or a key-fob (not shown) in communication with the controller 208.

The controller 208 of the illustrated embodiment is further configured to include a security mode. In the security mode, the exterior open switch 204 of each door 108 is assigned to the locked state. This prevents unauthorized entry to the vehicle 100 by persons outside of the vehicle 100. In the security mode, the interior open switch 206 of each door 108 may be assigned to the unlocked state. As such, an occupant of the vehicle 100 may still open the door 108 to exit the vehicle, while persons outside of the vehicle 100 are prevented from opening the door 108.

In certain embodiments, the security mode is canceled in response to at least one of the doors 108 being opened by using an interior open switch 206. As such, each of the interior and exterior open switches 204, 206 would be assigned to the unlocked state.

In the illustrated embodiment, the locked or unlocked state of the interior open switch 206 is dependent on the speed of the vehicle 100. Referring again to FIG. 2, the system 200 may include a velocity sensor 210 for sensing the velocity of the vehicle 100. The controller 208 is in communication with the velocity sensor 210, such that the controller 208 receives the velocity of the vehicle 100. In the illustrated embodiment, the controller 208 is configured to assign the locked state to the interior open switch 206 in response to the velocity of the vehicle 100 being greater than zero. As such, when the vehicle 100 is in motion, the door 108 is not openable using the interior open switch 206 or the exterior open switch 204. However, the controller 208 is also configured to assign the unlocked state to the interior open switch 206 in response to the velocity of the vehicle 100 being zero. Accordingly, the door 108 is openable using the interior open switch 206, but not with the exterior open switch 204. Moreover, a passenger of the vehicle 100 may open the door 108 and depart the vehicle 100 immediately upon the vehicle 100 coming to a stop. Thus, the passenger need not wait until the vehicle 100 transmission is put into "park", the vehicle 100 engine is turned off, or the driver issues an unlock command for the doors 108.

In other embodiments, the locked or unlocked state of the interior open switch switch 206 may be dependent on factors other than the speed of the vehicle. For instance, the locked or unlocked state may be dependent on the state of the transmission. For example, the interior open switch 206 may be assigned to the unlocked state when the transmission is put in "park". As such, when the vehicle 100 is in park, the door 108 is openable using the interior open switch 206. Of course, other factors may be utilized to change the locked or unlocked state of the interior open switch 206 in the security mode.

The controller 208 of the illustrated embodiment is also configured to include a child safety mode. In the child safety mode, the interior open switch 206 of at least one door 108 is assigned to the locked state. For example, the vehicle 100 of the illustrated embodiment includes two front doors 108 and two rear doors 108. The interior open switch 206 of the rear doors 108 is assigned to the locked state. As such, the rear doors 108 may not be opened using the respective interior open switch 206. Instead, the rear doors 108 must be opened using the exterior open switches 204. Thus, the child safety mode may be utilized to prevent a child from exiting or attempting to exit the vehicle 100 without adult supervision.

The modes described above may be combined. For instance, the controller 208 may be configured to execute the security mode and the child safety mode. In this combined mode, the open switches 204, 206 for the two front doors 108 are in the locked state when the vehicle 100 is in motion. When the vehicle is not in motion, i.e., stopped, then the interior open switches 206 are in the unlocked state while the exterior open switches 204 remain in the locked state. However, the open switches 204, 206 for the two rear doors 108 are in the locked state regardless of the velocity of the vehicle 100. The open switches 204, 206 for the two rear doors 108 will only be changed to the unlocked state upon change to the unlocked mode (described above).

The modes described above may be set manually by an operator of the vehicle 100. However, the mode may be automatically set by the controller 208 under certain conditions. For example, during a crash of the vehicle 100, the modes may be automatically assigned and/or automatically changed. The crash may be evidenced, e.g., by the deployment of an airbag (not shown) and/or by activation of various crash sensors (not shown). In one embodiment, the security mode would be set for 15 seconds in response to airbag deployment. This 15 second time delay is utilized as the outside handle is subject to inertia and mechanical deformation, which could cause the door 108 to unlatch. As such, the 15 second time delay helps keep the doors 108 closed in the event of a crash, especially a rollover crash or if multiple impacts are involved. However, while in the security mode, occupants can still exit the vehicle immediately. At the expiration of the 15 seconds, i.e., 15 seconds after the crash, the controller 208 switches to the unlocked mode, such that rescue can be attempted from the outside.

Referring again to FIG. 2, the system 200 may also include an indicator 212 in communication with the controller 208 for indicating the state of the open switches 204, 206. In the illustrated embodiment, the indicator includes a first lamp 214 and a second lamp 216 electrically connected to the controller 208. More specifically, in the illustrated embodiment, each lamp 214, 216 is a bi-color light emitting diode ("LED") for producing two different colors of light. Each different color of light represents either the locked state or the unlocked state of each open switch 204, 206. Even more specifically, each lamp 214, 216 produces a red light to represent the locked state and a green light to represent the unlocked state.

Of course, other techniques may be utilized to show the state of each open switch 204, 206. For example, a light (not shown) may be illuminated to indicate a locked state of one of the open switches 204, 206 while the light may be not illuminated to indicate the unlocked state.

In the illustrated embodiment, the first lamp 214 indicates the locked state and/or the unlocked state of the exterior open switch 204. The second lamp 216 indicates the locked state and/or the unlocked state of the interior open switch 206. As shown in FIG. 3, the lamps 214, 216 are associated with the door 108. More specifically, the lamps 214, 216 of the illustrated embodiment are coupled to the door 108, such that they may be viewed by users of the vehicle 100. Even more specifically, the first lamp 214 is disposed adjacent the exterior side 110 of the door 108 and the second lamp 216 is disposed adjacent the interior side 112 of the door 108.

The system 200 may also include a display (not shown). The display may be utilized to indicate the locked state and/or the unlocked state of each of the switches 204, 206 of each door 108 of the vehicle 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A door latch system for a vehicle, the vehicle having a body defining an inside and an outside and a door having an exterior side associated with the outside of the vehicle and an interior side associated with the inside of the vehicle, said system comprising:

an electric door latch mechanism movable between a latched position and an unlatched position;

an exterior open switch disposable on the exterior side of the door for receiving an unlatch request from the outside of the vehicle;

an interior open switch disposable on the interior side of the door for receiving an unlatch request from the inside of the vehicle;

a controller in communication with said exterior open switch, said interior open switch, and said electric door latch mechanism, said controller configured to assign either a locked state or an unlocked state for each of said open switches and control operation of said electric door latch mechanism such that said electric door latch mechanism is commanded to move from the closed position to the open position in response to the unlatch request from said open switches when the respective open switch is in the unlocked state;

a first indicator to visually display the locked state and/or unlocked state of said exterior open switch; and a second indicator to visually display the locked state and/or unlocked state of said interior open switch.

2. A system as set forth in claim 1 wherein said first indicator comprises a first lamp associated with the door for indicating the locked state and/or the unlocked state of said exterior open switch.

3. A system as set forth in claim 2 wherein said second indicator comprises a second lamp associated with said door for indicating the locked state and/or the unlocked state of said interior open switch.

4. A system as set forth in claim 3 wherein said first lamp is disposed adjacent the exterior side of the door and said second lamp is disposed adjacent the interior side of the door.

5. A system as set forth in claim 1 wherein said controller is in communication with a velocity sensor for sensing a velocity of the vehicle.

6. A system as set forth in claim 5 wherein said controller includes a security mode such that said controller is configured to assign the locked state to said interior open switch in response to the velocity of the vehicle being greater than zero.

7. A system as set forth in claim 1 wherein a transmission of the vehicle has a park mode and at least one drive mode and wherein said controller includes a security mode such that said controller is configured to assign the locked state to said interior open switch in response to the transmission leaving the park mode.

8. A system as set forth in claim 1 wherein said controller includes a child security mode such that said controller is configured to assign the locked state to said interior open switch.

9. A vehicle having a body defining an inside and an outside, said vehicle comprising:

a plurality of doors with each door having an exterior side associated with the outside of said vehicle and an interior side associated with the inside of said vehicle;

an electric door latch mechanism associated with each of said plurality of doors, the mechanism movable between a latched position and an unlatched position;

an exterior open switch disposable on the exterior side of said door for receiving an unlatch request from the outside of the vehicle;

an interior open switch disposed on the interior side of the door for receiving an unlatch request from the inside of the vehicle;

a controller in communication with said exterior open switch, said interior open switch, and said electric door latch mechanism, said controller configured to assign either a locked state or an unlocked state for each of said open switches and control operation of said electric door latch mechanism such that said electric door latch mechanism will be commanded to move from the closed position to the open position in response to the unlatch request from said open switches when the respective open switch is in the unlocked state;

a first indicator to visually display the locked state and/or unlocked state of said exterior open switch; and a second indicator to visually display the locked state and/or unlocked state of said interior open switch.

10. A vehicle as set forth in claim 9 wherein said first indicator comprises a first lamp associated with at least one door of said plurality of doors for indicating the locked state and/or the unlocked state of said exterior open switch of said at least one door.

11. A vehicle as set forth in claim 10 wherein said second indicator comprises a second lamp associated with said at least one door for indicating the locked state and/or the unlocked state of said interior open switch of said at least one door.

12. A method of operating an electric door latch mechanism of a vehicle, the vehicle having a body defining an inside and an outside and a door having an exterior side associated with the outside of the vehicle and an interior side associated with the inside of the vehicle, the mechanism movable between a latched position and an unlatched position, an exterior open switch disposed on the exterior side of the door, an interior open switch disposed on the interior side of the door, a controller in communication with the switches and the mechanism, said method comprising:

assigning either a locked state or an unlocked state to each of the open switches;

receiving an unlatch request signal at the controller from at least one of the switches;

sending a control signal from the controller to the door control mechanism to move the mechanism from the closed position to the open position in response to receiving the unlatch request from one of the open switches and the respective open switch is in the unlocked state;

illuminating a first indicator to visually display the locked state and/or unlocked state of said exterior open switch; and illuminating a second indicator to visually display the locked state and/or unlocked state of said interior open switch.

13. A method as set forth in claim 12 wherein illuminating the first indicator comprises illuminating a first lamp to indicate the locked state and/or the unlocked state of the exterior open switch.

14. A method as set forth in claim 13 wherein illuminating the second indicator comprises illuminating a second lamp to indicate the locked state and/or the unlocked state of one of the interior open switch.

15. A method as set forth in claim 12 further comprising receiving a velocity signal representing a velocity of the vehicle at the controller from a velocity sensor.

16. A method as set forth in claim 15 further comprising assigning a locked state to the interior open switches in response to the velocity of the vehicle being greater than zero.

17. A method as set forth in claim 12 wherein a transmission of the vehicle has a park mode and at least one drive mode, said method further comprising assigning a locked state to the interior open switch in response to the transmission leaving the park mode.

* * * * *